(12) United States Patent
Petrovic

(10) Patent No.: US 10,765,139 B2
(45) Date of Patent: *Sep. 8, 2020

(54) SERVO KNOCK OUT ASSEMBLY

(71) Applicant: FORMER ASSOCIATES, LLC, Kenosha, WI (US)

(72) Inventor: James Petrovic, Kenosha, WI (US)

(73) Assignee: FORMER ASSOCIATES, LLC, Kenosha, WI (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/007,957

(22) Filed: Jan. 27, 2016

(65) Prior Publication Data

US 2016/0213055 A1   Jul. 28, 2016

Related U.S. Application Data

(60) Provisional application No. 62/107,783, filed on Jan. 26, 2015.

(51) Int. Cl.
*A22C 7/00* (2006.01)
*A23P 30/10* (2016.01)

(52) U.S. Cl.
CPC ............ *A23P 30/10* (2016.08); *A22C 7/0023* (2013.01); *A22C 7/0038* (2013.01); *A22C 7/0076* (2013.01); *A22C 7/0084* (2013.01)

(58) Field of Classification Search
CPC ... A22C 7/0038; A22C 7/0084; A22C 7/0023; A22C 7/0076; A23P 30/10

USPC .................................. 425/139, 236, 556, 574
See application file for complete search history.

(56) References Cited

U.S. PATENT DOCUMENTS

| | | | |
|---|---|---|---|
| 2,932,246 A | 4/1960 | Galas | |
| 3,266,442 A | 8/1966 | Udall et al. | |
| 3,417,425 A | 12/1968 | Holly | |
| 3,452,389 A | 7/1969 | Felstehausen | |
| 3,474,491 A | 10/1969 | Holly | |
| 3,526,924 A | 9/1970 | Holly | |
| 6,238,196 B1 * | 5/2001 | Hyllstam | A21C 11/00 425/139 |
| 7,335,013 B2 * | 2/2008 | Hansen | A22C 7/0023 425/556 |
| 7,422,425 B2 * | 9/2008 | Hansen | A22C 7/0023 425/556 |
| 2002/0115402 A1 * | 8/2002 | Sandberg | A22C 7/0084 452/174 |
| 2008/0179793 A1 * | 7/2008 | Schad | B29C 45/4005 264/334 |
| 2010/0209575 A1 * | 8/2010 | Moore | A22C 7/0038 426/389 |
| 2012/0045534 A1 | 2/2012 | Lindee et al. | |

* cited by examiner

*Primary Examiner* — Seyed Masoud Malekzadeh
(74) *Attorney, Agent, or Firm* — Sughrue Mion, PLLC

(57) ABSTRACT

One or more embodiments of the disclosure relates to an electrical servo knock out assembly for use with knock out cups in a food forming machine using an electrical linear servo motor and a return spring. The combination of the linear servo motor and return spring provides for a knock out assembly without the need for complex hydraulics or gearboxes.

13 Claims, 4 Drawing Sheets

SERVO KNOCK OUT ASSEMBLY

FIELD OF THE INVENTION

The invention is related to the field of machinery for food processing. More particularly, the application relates to the field of knock out assemblies for use with knock out cups and mold plates in food processing machines.

BACKGROUND

In the related art of preparing processed foods, there are a variety of machines that can be used to turn raw ingredients into processed food products. These processed foods can be of any variety of foods, including meats, vegetables, grains, or combinations thereof.

In particular, food forming machinery can create processed foods by forming the shape of the processed food. In this way, foods such as hamburger patties and chicken patties can be formed from meat. One example of this kind of food forming machinery is the Provisur Formax F-26.

Traditionally, food forming machinery of this type uses hydraulic systems or complex gear drives to control and operate the various components inside the complex machinery. These hydraulic systems or complex gear drives were necessary in order to provide sufficient force to accomplish the various steps that are needed in forming processed foods. In the case of gear drives in the related art, the complex gear drives utilize 90 degree gearboxes to change horizontal rotation of a shaft to vertical movement by ways of cams.

SUMMARY

Exemplary embodiments of the present application provide for an electrical servo knock out assembly for driving knock out cups in a food forming machine by using an electrical linear servo motor.

In embodiments of a food forming machine, ingredients are processed and the mixture is positioned under the knock out assembly with a mold plate. Upon being positioned under the knock out assembly, the knock out assembly can then knock out the desired shape of the processed food by means of driving knock out cups towards the mold plate. The knock out cups are attached to the knock out assembly, and the knock out assembly can operate to them to drive into the positioned mixture in order to knock product out of the mold plate.

By using a vertical linear servo motor, the knock out assembly of the present disclosure significantly reduces the number of components as compared to the knock out assemblies using hydraulic systems or complex gear drives. By eliminating wear components such as shafts and cams of complex gear drives, the use of the electrical linear servo motor can reduce cost by lessening the number of replacement components and increasing the length of time between scheduled maintenance.

Additionally, the use of a vertical linear servo motor may provide for a more easily accessible design for replacement of components without the need for removal of overhead cams or hydraulics.

Separately, the use of an electrical linear servo motor eliminates the potential need for a hydraulic system or oiling system for the knock out operation. This may also allow for easier packaging of the food forming machine as this eliminates the need for the complex components necessary for the operation of the hydraulic system. Additionally, the elimination of the hydraulic system removes the chance of a mess being created by a leaking of the hydraulic fluid or oil and any subsequent contamination of food due to the hydraulic fluid or oil.

One or more embodiments of the disclosure relates to an electrical servo knock out assembly for use with knock out cups in a food forming machine using an electrical linear servo motor and including the use of at least one return spring. The return spring may be a conventional spring, a magnetic spring, or other type of spring. The return spring provides for the ability to return the knock out cups away from the mold plate in the event of a power loss. This prevents crashing into the mold plate and damaging both the knock out cups and the mold plates if power is lost or there is a failure of the electrical linear servo motor when the mold plate is being positioned.

According to one or more embodiments, the knock out assembly may include a linear motor, at least one return spring, and a knock out shaft. The knock out shaft may be configured to be moved in a linear motion by the linear motor and configured to be moved in a direction of the linear motion by the at least one return spring.

Furthermore, the knock out assembly may further include a crossbar, wherein the linear motor is coupled to the crossbar, the at least one return spring is coupled to the crossbar, and the knock out shaft is coupled to the cross bar.

In one or more embodiments, the knock out assembly may also include a base to which the linear motor is mounted.

Embodiments of the knock out assembly may also provide for wherein the base comprises a primary mounting bracket, the primary mounting bracket comprising a protrusion having a through hole configured to accommodate the knock out shaft.

According to one or more embodiments, the knock out assembly may further include a spring mounting bracket, wherein the at least one return spring is mounted to the spring mounting bracket, and wherein the spring mounting bracket is mounted on the protrusion of the primary mounting bracket.

Also, the knock out assembly may further include wherein the protrusion of the base further comprises a flat portion for mounting the at least one return spring.

In some embodiments, the linear motor of the knock out assembly may be a linear servo motor.

In an embodiment, the knock out assembly may also include a crossbar, wherein a first return spring and a second return spring are mounted to the crossbar at opposing ends of the crossbar, wherein the linear motor is centrally mounted to the crossbar, and wherein the knock out shaft is mounted to the crossbar between the linear motor and the first return spring, and a second knock out shaft is mounted to the crossbar between the linear motor and the second return spring.

According to one or more embodiments, the knock out assembly may include a base comprising a primary mounting bracket, the primary mounting bracket comprising a first protrusion and a second protrusion, the first protrusion and the second protrusion each having a through hole configured to accommodate the knock out shaft and the second knock out shaft respectively.

In some embodiments, the knock out assembly may include wherein each through hole of the first protrusion and the second protrusion is configured to accommodate a linear ball bearing.

According to one or more embodiments, the knock out assembly may include a crossbar, a base, and a primary mounting bracket, which is mounted to the base, wherein the at least one return spring is mounted to the base, and wherein the linear motor is mounted to the linear motor mounting bracket.

According to one or more embodiments, the knock out assembly may include a base, the base comprising a primary mounting bracket and a linear motor mounting bracket, wherein the linear motor mounting bracket is configured to allow detachable mounting of the linear motor to the primary mounting bracket.

According to one or more embodiments, there is disclosed a method for knocking out product, the method comprising moving a knock out shaft in a linear motion by a linear motor and knocking out product by a knock out cup due to the linear motion of the knock out shaft, wherein the moving of the knock out shaft compresses a return spring, the return spring being configured to move the knock out shaft in a direction of the linear motion.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Although the description discloses application to patty or meat formation, it is not restricted to such. Application to other production methods, such as baked goods, requiring knock out may be understood by one of ordinary skill in the art.

According to embodiments of the knock out assembly using a linear servo motor, the knock out assembly of the present disclosure significantly reduces the number of components as compared to the knock out assemblies using hydraulic systems or complex gear drives.

Figure 1:
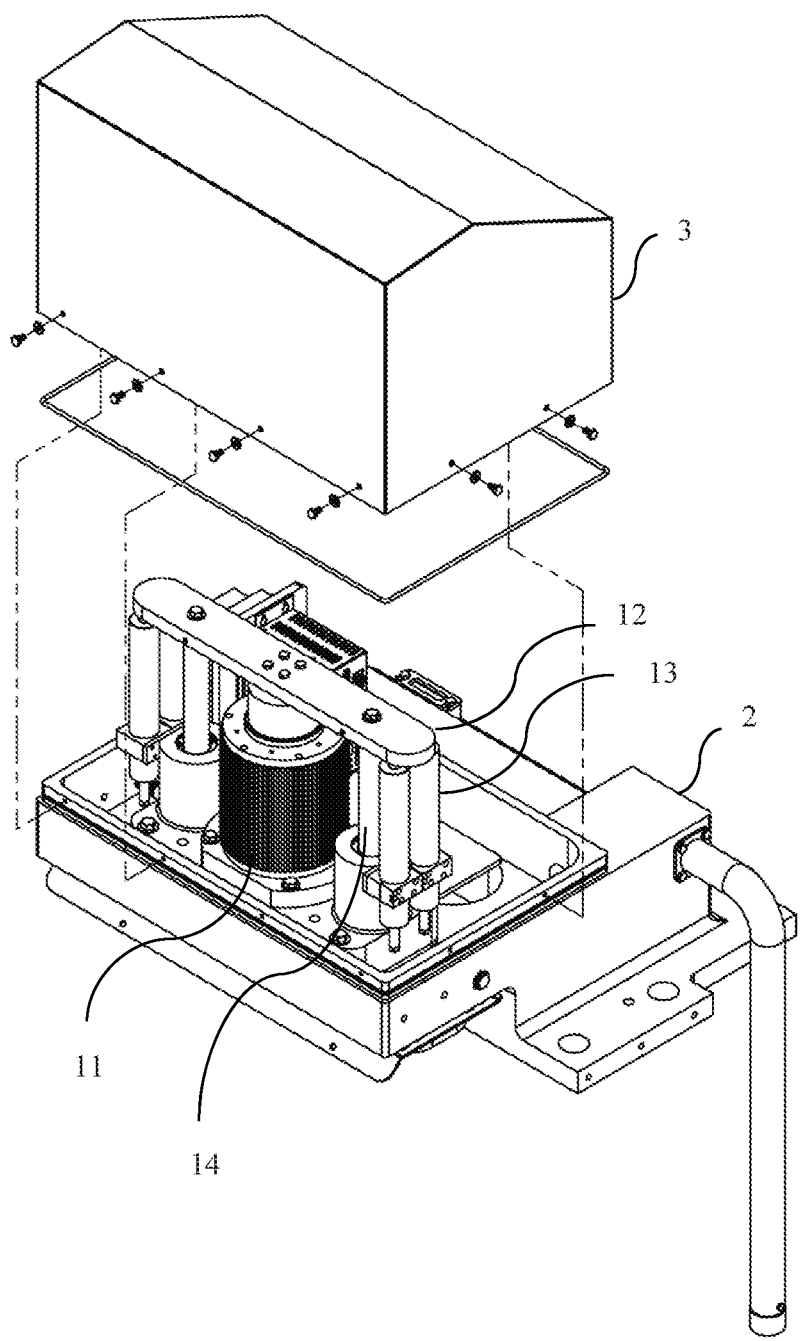
FIG. 1 shows an exemplary embodiment of an apparatus for using a linear servo motor in a knock out assembly.

FIG. 1 shows an exemplary embodiment of the present disclosure. The knock out assembly 1 generally has at least a base 2, a linear servo motor 11, a crossbar 12, return springs 13, and a knock out device including knock out shafts 14 coupled to knock out cups (not shown). The entire assembly may also be covered by an assembly cover 3.

The linear servo motor 11 and return springs 13 are attached to the base 2 of the assembly, and one end of each is also attached to the crossbar 12. A first end of a knock out shaft 14 is attached to the crossbar 12 and the second end is coupled to a knock out cup, which is shaped as necessary for the desired food product. The knock out shaft 14 extends through the base 2 in order to couple with the knock out cup below the base.

In an exemplary embodiment, the return springs 13 may be magnetic springs. Additionally, the number of return springs may be one or more. The knock out assembly is not limited to four return springs as shown in the exemplary embodiment. The number of return springs may be different for various considerations. For example, in alternative embodiments, the knock out assembly may have two return springs on each end of the crossbar 12 for a total of 4 return springs. In non-limiting embodiments, these return springs may be aligned along the longitudinal axis of the crossbar 12 or grouped at the ends of the crossbar 12. In some embodiments, the return springs may be spaced along the crossbar 12.

Although the embodiment of FIG. 1 shows two knock out shafts 14, alternative embodiments may include differing numbers of knock out shafts 14.

Also, although embodiments with magnetic return springs are disclosed, alternative springs could be used, not limited to conventional, magnetic, electric, pneumatic, or hybrids.

In some embodiments, the knock out shaft 14 may be directly attached to a singular knock out cup or other tooling. Alternatively, the knock out shaft 14 may attach to an intermediate crossbar or other attachment means to which a plurality of knock out cups are attached. In some embodiments, at least two knock out shafts are coupled together to couple with the knock out cups. Additionally, the knock out cups could be of a variety of shapes in order to form the desired foods.

Also, while the description discloses use of a linear servo motor, alternative linear movement power units could be used. These may include, but are not limited to, solenoid units. The primary concern is a power unit that can operate linearly without the need for complex hydraulics or angled gearboxes.

Figure 2:
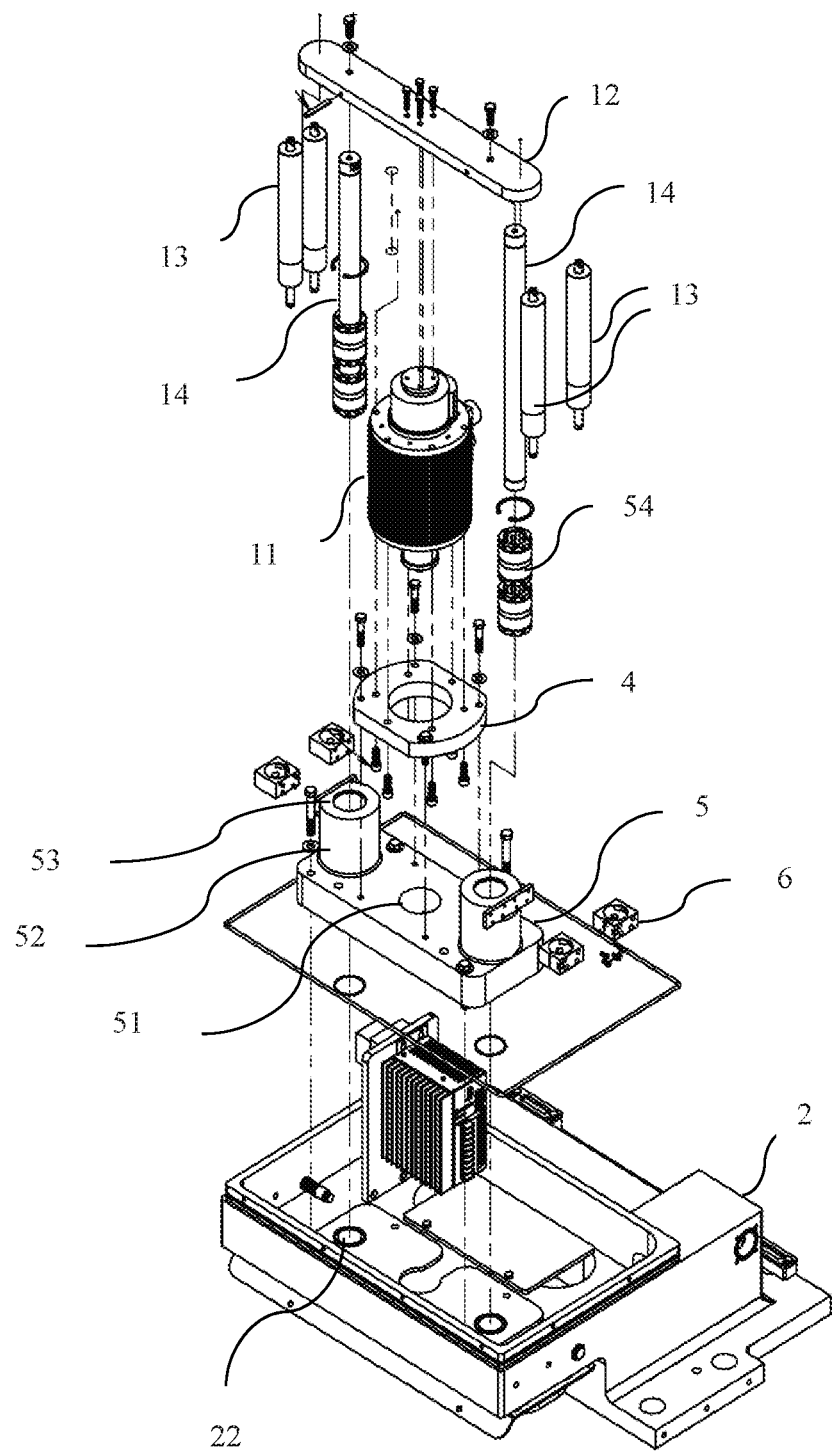
FIG. 2 shows the exemplary embodiment of the apparatus for using a linear servo motor in a knock out assembly in an exploded view.

FIG. 2 shows an exploded view of an exemplary embodiment of the present disclosure. In the embodiment, a primary mounting bracket 5 is attached by fasteners to the base 2. The primary mounting bracket 5 has a linear servo motor mounting portion 51 and two knock out shaft protrusions 52. The knock out shaft protrusions 52 may be cylindrical and protrude upward from the base. Alternatively, the top view cross sectional shape of the knock out shaft protrusions 52 may be another shape, such as a square or triangle. The cross sectional shape may be a basis for mounting considerations of related accessories, such as the return springs 13. The knock out protrusions 52 may have a flat portion 55 for attachment of a return spring bracket 6. Alternatively, the knock out protrusions 52 may be a square or triangle such that there is a flat surface for attachment of a return spring bracket 6. Even in the case of a flat surface, there may still be a ledge or stepped flat portion for mounting of a return spring bracket to enable easier positioning and mounting.

The knock out shaft protrusions 52 each have a through hole 53 for accepting and guiding the knock out shaft 14. Within the through hole 53, there can be at least one linear bearing, ball bushing, or shaft guiding 54 to provide for smooth movement of the knock out shaft 14. The linear bearing may be a linear ball bearing, bearing pad, or other component. The through hole 53 of each knock out protrusion 52 also matches up with through holes 22 in the base 2. This allows for the knock out shaft 14 to extend out of the base 2 in order to couple with the knock out cups.

Upon the primary mounting bracket 5, a linear motor mounting bracket 4 may be attached by fasteners. The linear motor mounting bracket 4 is attached to the linear servo motor mounting portion 51 of the primary mounting bracket 5. The linear motor mounting bracket 4 may be shaped in order to allow for the proper spacing and mounting of a variety of linear servo motors. The use of a linear motor mounting bracket may allow for removal of the linear servo motor without the need to disassemble the other components of the knock out assembly.

The linear servo motor 11 can thus be fixedly mounted to the linear motor mounting bracket 4 on top of the primary mounting bracket 5. A driving end of the linear motor mounting bracket is then coupled to the crossbar 12 by fasteners. Accordingly, application of the linear motor can result in vertical movement of the crossbar 12 relative to the base 2.

The crossbar 12 is also attached at an outboard location to return springs 13. The return spring 13 is attached on one side to the crossbar 12 and on another side to return spring bracket 6. These return spring bracket 6 is attached to the flat portion 55 of the knock out shaft protrusion 52 of the primary mounting bracket 5 such that the return spring 13 pushes between the crossbar 12 and the primary mounting bracket 5. While the return spring 13 may be attached to the crossbar 12 and the return spring bracket 6 at opposing ends of the return spring 13, the return spring 13 can also be attached to one of the crossbar 12 and the return spring bracket 6 by a moving shaft of the return spring and a location along an outer body casing of the return spring 13 respectively.

Alternatively, one or more embodiments may have the return spring 13 configured to be attached to the crossbar 12 and to the cover 3 or another fixed element above the crossbar 12. In such an embodiment, the return spring 13 would be extended when the linear servo motor is in the down position.

Also, the crossbar 12 is coupled to one end of the knock out shaft 14, and the knock out shaft 14 is coupled to the knock out cups at a second end. Accordingly, when the linear servo motor 11 operates to move the crossbar 12, the knock out shaft 14 is also moved and the return spring 13 is compressed. This results in the knock out shaft 14 moving downward and also forcing the attached knock out cups towards a mold plate mounted to the food processing machine. Upon this movement, the compressed return spring 13 also exerts a restoring force to return the crossbar to an upward position, thereby lifting the knock out cups from the mold plate.

The return spring provides a restoring force to return the knock out cups away from the mold plate. This is useful as a loss of power to the linear servo motor without a return mechanism may result in the servo motor dropping downward. As the mold plate in a food processing machine moves in and out of position for knock out, the dropping of the servo motor in a loss of power situation may result in the knock out cups hitting the mold plate and damaging both components. The inclusion of the return spring prevents an uncontrolled drop of the linear servo motor that would result in damage to the knock out cups and mold plate.

Accordingly, this embodiment provides for the movement of the knock out cups towards the mold plate without the complexities of hydraulic controls or 90 degree gearboxes to translate horizontal rotational motor movement into vertical movement by way of cams.

While the embodiment of FIG. 2 has the return spring bracket 6 mounted to a flat portion 55 of the primary mounting bracket 5, the return spring bracket could alternatively be mounted to the base 2.

In alternative embodiments, a plurality of linear servo motors may be positioned on outer portions of the crossbar and the springs positioned on a central or inner portion of the crossbar. A plurality of linear servo motors that are synchronized may be used instead of one linear servo motor.

Also, while the shape of the crossbar 12 is generally beam-like in FIG. 1, alternative shapes may be used. For example, a square shaped crossbar or plate could be utilized where the linear servo motor is attached the middle and the return springs are attached at corners of the square shaped crossbar. Alternative shapes such as a circle or a triangle could also be used for the crossbar. Alternative shapes of the crossbar 12 may also be combined with differing embodiments with different numbers of linear motors, knock out shafts, and return springs.

In alternative embodiments, the configuration of the springs and linear servo motor may be changed. For example, the spring or plurality of springs may be fixed from above the crossbar to another structure of the food forming machinery such that the spring would exert a pulling force to lift the crossbar rather than a pushing force on the crossbar. Also, the linear servo motor may be fixed from above the crossbar to another structure of the food forming machinery such that the motor would exert a pushing force to push the crossbar and coupled knock out cups downward into the mold plate. Such a structure of the food forming machinery may include the assembly cover 3. Accordingly, one of ordinary skill would understand various configurations where the springs and linear servo motors may either push or pull on the crossbar.

Also, although the exemplary embodiment uses a variety of brackets in the primary bracket 5, linear motor mounting bracket 4, and return spring bracket 6, these brackets may be integrally formed with the base 2. In this way, these brackets may be bracket portions of the base 2 rather than separate components.

Figure 3:
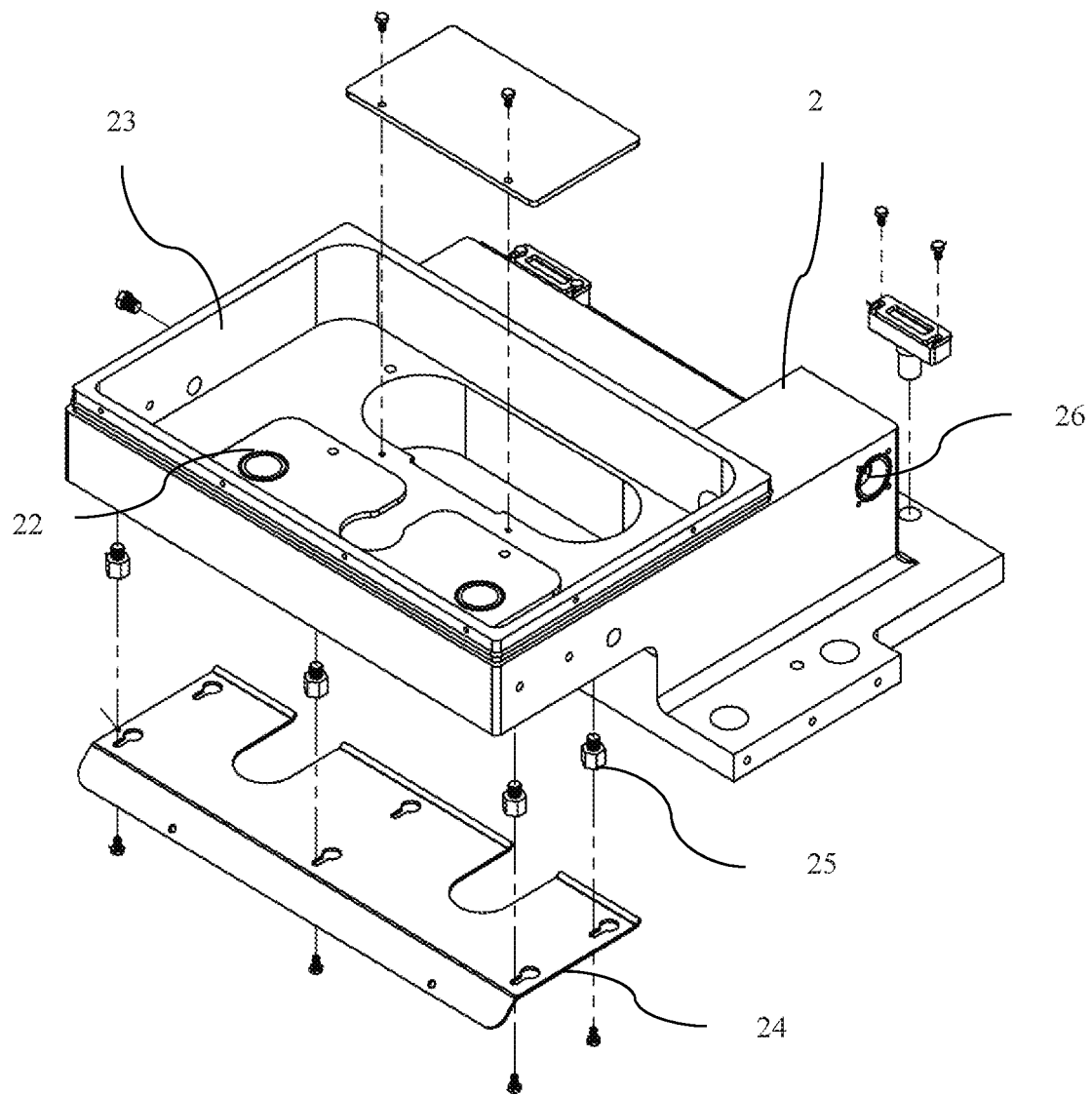
FIG. 3 shows an orthogonal view of a base of an embodiment of the apparatus for using a linear servo motor in a knock out assembly.

FIG. 3 shows the elements related to the base 2. The base 2 includes a central recess 23 for the mounting of the primary bracket 5 and the related components for the linear servo motor 11. The base also includes a heat shield 24 below the base 2 that is attached at a distance away from the base by heat shield standoffs 25 and fasteners. Furthermore, the base 2 includes through holes from the recessed portion to the bottom of the base 2 to accommodate knock off shafts 14. Also, embodiments of the base 2 may include a external wiring port 26 connected to an opening in the central recess 23 for running of wiring and other connections from the central recess 23 out of the knock out assembly.

Figure 4:
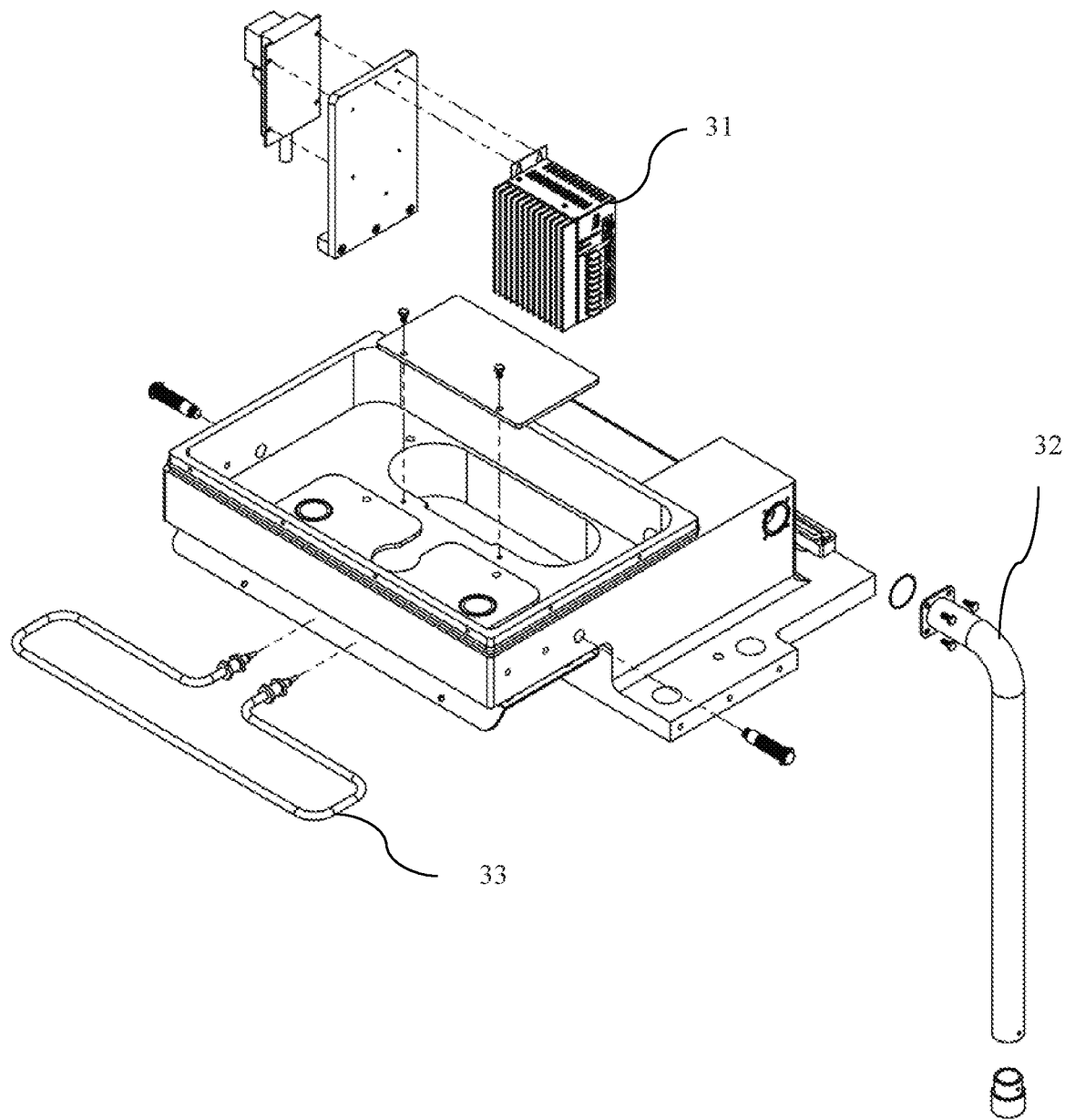
FIG. 4 shows an orthogonal view of the base of the embodiment of the apparatus for using a linear servo motor in a knock out assembly.

FIG. 4 further shows the elements related to the base 2. FIG. 4 further shows the inclusion of a radiant heating loop 33. The radiant heating loop 33 may be a resistance heater or other heating element. The radiant heating loop 33 may be mounted to the base under the heat shield 24. The radiant heating loop 33 may provide heat in order to maintain a temperature difference between the food product and the knock out cups in order to prevent sticking. In alternative embodiments, the radiant heating loop 33 may be positioned underneath the base 2 by attachment to the food forming machinery other than by direct attachment to the knock out assembly. In an alternative embodiment, the radiant heating loop may be positioned off a mount attaching to the base structure of the food forming machinery.

In some embodiments, a knock out assembly heater 31 can also be attached to the base 2 in order to achieve the temperature difference. This may occur where a food processing machine is not pre-wired for a radiant heating loop in the knock out assembly.

Furthermore, FIG. 4 shows the base 2 may have a conduit or pipe 32 attached to the external wiring port 26 in order to provide a route for electrical wiring from the various components of the knock out assembly to be routed to the food processing machine.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

The knock out assembly base may be an integrated part of a food processing machine or separate. Embodiments of the disclosure may be replacement or bolt-on knock out assemblies for retrofitting on machines, such as the aforementioned hydraulic or cam driven machines.

The various components of the knock out assembly may be made from a variety of materials, not limited to metals, composites, or plastics. It is noted that various combinations of components of similar or differing materials may be used.

The invention claimed is:

1. A food processing knock out assembly, the knock out assembly comprising:
   a linear motor;
   at least one return spring;
   a knock out device for knocking out a food product, the knock out device comprising at least one knock out shaft; and
   a crossbar, wherein
   the linear motor is configured to drive the at least one knock out shaft downward and to extend or retract the at least one return spring into an extended position or a compressed position, respectively, and a restoring force of the at least one return spring is configured to drive the at least one knock out shaft upward into a retracted position, and
   the linear motor, the at least one return spring, and the at least one knock out shaft are coupled to respective points of the crossbar that are different from each other, and
   the linear motor is configured to move the crossbar, and by moving the crossbar, drive the at least one knock out shaft downward and move the at least one return spring into the extended position or the compressed position.

2. The knock out assembly according to claim 1, the knock out assembly further comprising:
   a base to which the linear motor is mounted.

3. The knock out assembly according to claim 2, wherein the base comprises a primary mounting bracket, the primary mounting bracket comprising a protrusion having a through hole configured to accommodate one of the at least one knock out shaft.

4. The knock out assembly according to claim 3, the knock out assembly further comprising:
   a spring mounting bracket,
   wherein one of the at least one return spring is mounted to the spring mounting bracket, and
   wherein the spring mounting bracket is mounted on the protrusion of the primary mounting bracket.

5. The knock out assembly according to claim 3, wherein the protrusion of the base further comprises a flat portion configured to mount to the one of the at least one return spring.

6. The knock out assembly according to claim 1, wherein the linear motor is a linear servo motor.

7. The knock out assembly according to claim 1, wherein
   the at least one return spring comprises a first return spring and a second return spring, which are mounted to the crossbar at a first end of the crossbar and a second end of the crossbar, respectively, the first end of the crossbar is an opposite side of the crossbar from the second end, in a horizontal direction perpendicular to a downward direction,
   the linear motor is centrally mounted to the crossbar between the first return spring and the second return spring in the horizontal direction, and
   the at least one knock out shaft comprises a first knock out shaft, which is mounted to the crossbar between the linear motor and the first return spring in the horizontal direction, and a second knock out shaft, which is mounted to the crossbar between the linear motor and the second return spring in the horizontal direction.

8. The knock out assembly according to claim 7, the knock out assembly further comprising:
   a base comprising a primary mounting bracket;
   the primary mounting bracket comprising a first protrusion and a second protrusion, the first protrusion and the second protrusion each having a through hole configured to accommodate the first knock out shaft and the second knock out shaft respectively.

9. The knock out assembly according to claim 8, wherein each through hole of the first protrusion and the second protrusion is configured to accommodate a linear ball bearing.

10. The knock out assembly according to claim 1, the knock out assembly further comprising:
    a base;
    a primary mounting bracket, which is mounted to the base, and
    a linear motor mounting bracket, which is mounted to the base,
    wherein the return spring is mounted to the base and the crossbar, and
    wherein the linear motor is mounted to the linear motor mounting bracket and the crossbar.

11. The knock out assembly according to claim 1, the knock out assembly further comprising:
    a base, the base comprising a primary mounting bracket and a linear motor mounting bracket,
    wherein the linear motor mounting bracket is configured to allow detachable mounting of the linear motor to the primary mounting bracket.

12. The knock out assembly according to claim 2, wherein the base is provided at a first side of the linear motor, and the crossbar is provided at a second side of the linear motor, opposite of the first side of the linear motor.

13. The knock out assembly according to claim 1, wherein an entirety of one or more of the at least one knock out shaft is located between, in a horizontal direction perpendicular to a downward direction, an entirety of the linear motor and an entirety of one or more of the at least one return spring.

\* \* \* \* \*